(No Model.)

W. J. JACKSON.
THRASHING MACHINE.

No. 285,036. Patented Sept. 18, 1883.

Witnesses:
James E. Seat
David P. Lewis

Inventor:
W. J. Jackson

UNITED STATES PATENT OFFICE.

WILLIAM J. JACKSON, OF HUNTSVILLE, ALABAMA.

THRASHING-MACHINE.

SPECIFICATION forming part of Letters Patent No. 285,036, dated September 18, 1883.

Application filed October 5, 1882. (No model.)

*To all whom it may concern:*

Be it known that I, WILLIAM J. JACKSON, a citizen of the United States, residing at Huntsville, in the county of Madison and State of Alabama, have invented certain new and useful Improvements in Thrashing-Machines, of which the following is a specification, reference being had to the annexed drawings, in which like letters indicate like parts.

Figure 1:
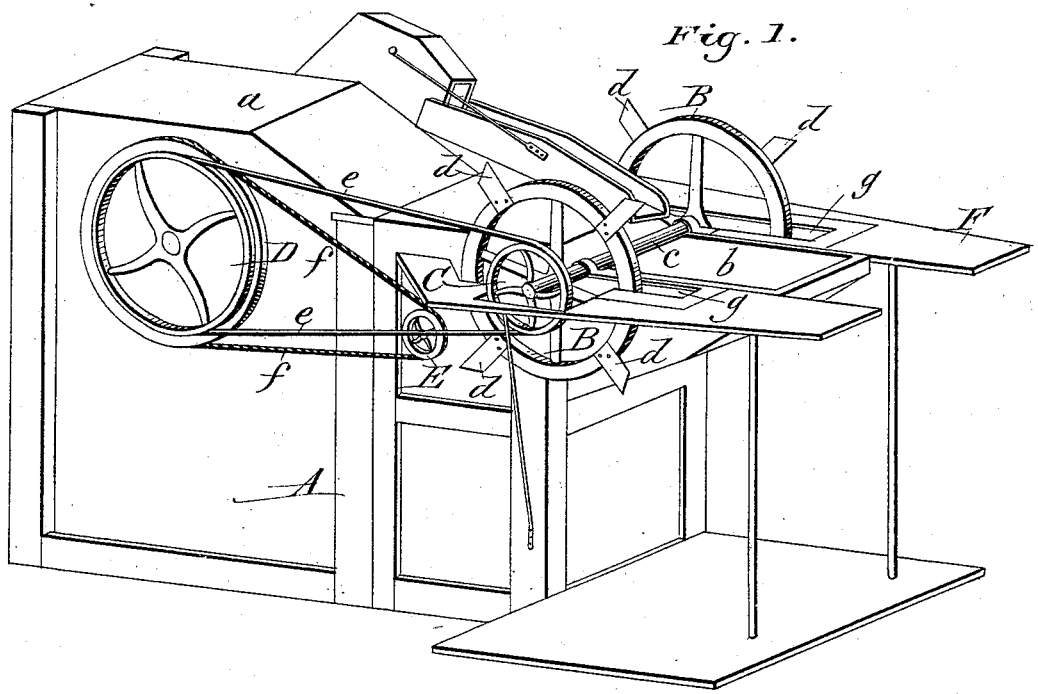
Figure 2:
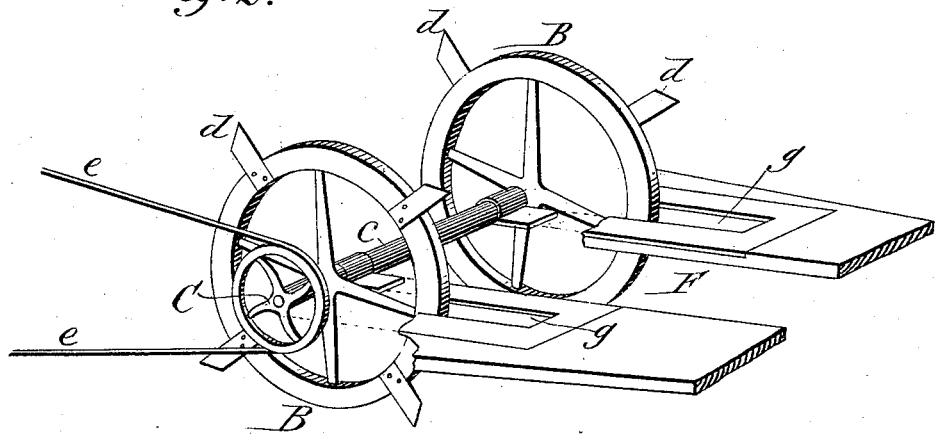

Figure 1 is a perspective view of a thrashing-machine provided with my improved sheaf-cutting attachments, and Fig. 2 is a perspective view of the rotary cutters detached.

The object of my invention is to provide means for cutting off so much of the straw as contains no grain, leaving only the heads of the grain to pass through the thrasher, and casting off the bulk of the straw and preventing it from going into and through the machine, thereby diminishing the draft and weight of running the thrashing-cylinders, and enabling it to be driven with less power.

A represents a thrashing-machine of any suitable or ordinary construction, the thrashing-cylinder (not shown) being inclosed in the box or casing $a$, in the usual manner. On a level with the platform or table $b$, exterior to and in front of the cylinder-casing $a$, is journaled an axle or shaft, $c$, that carries near each end a rotary cutter, B, consisting of a disk or wheel, the periphery of which is provided at intervals with cutting-blades $d\,d$, of any suitable construction. The shaft $c$ also carries at one end a pulley, C, that is driven by a belt, $e$, from a larger pulley, D, on the shaft of the thrashing-cylinder, the latter being driven by a belt, $f$, from a pulley, E, on the driving-shaft. The cutter-shaft $c$ is preferably journaled to a bench or frame, F, on a level with the platform of the thrasher, and of size and strength sufficient to afford a steady support, the cutters B being arranged to rotate in slots $g\,g$, formed in said bench or frame.

The sheaf of grain is placed by hand in front of and under the blades or cutters $d\,d$, in such a position that the portion of the straw containing the grain will be cut off and dropped into the mouth of the thrasher, the balance of the straw or the ends of the sheaf that have thus been cut off being cast aside as refuse. As only such straw as contains grain is thus passed into the thrasher, it is obvious that less power will be required to drive the thrashing-cylinder.

Having thus described my invention, what I claim as new, and desire to secure by Letters Patent, is—

1. In a thrashing-machine, the combination, with the cylinder-casing and the thrashing-cylinder, of rotary cutters arranged on the outside and in front of the cylinder-casing, whereby the ends of a sheaf are cut off and only so much straw passed into the thrasher as contains grain, substantially as described.

2. In a thrashing-machine, the combination, with the cylinder-casing $a$ and a thrashing-cylinder, the shaft of which is provided with a pulley, D, of the shaft $c$, arranged in front of the cylinder-casing, and carrying rotary cutters B B and pulley C, the pulley E on the main driving-shaft, and the belting $e\,f$, substantially as shown and described.

W. J. JACKSON.

Witnesses:
 WM. VAUGHAN,
 DAVID P. LEWIS.